United States Patent [19]

Komatsu

[11] Patent Number: 4,502,581

[45] Date of Patent: Mar. 5, 1985

[54] CLUTCH DISK FOR A CLUTCH AND METHOD OF TREATING A FACING OF A CLUTCH

[75] Inventor: Hiroshi Komatsu, Hachioji, Japan

[73] Assignee: Fuji Jukogyo Kabushiki Kaisha, Tokyo, Japan

[21] Appl. No.: 415,766

[22] Filed: Sep. 7, 1982

[30] Foreign Application Priority Data

Sep. 8, 1981 [JP] Japan .................. 56-141945

[51] Int. Cl.³ .............. F16D 69/02; F16D 13/64
[52] U.S. Cl. .................. 192/70.14; 106/36; 192/107 M; 427/11
[58] Field of Search .......... 192/107 M, 70.14; 188/251 M; 106/36; 427/11

[56] References Cited

U.S. PATENT DOCUMENTS

| | | | |
|---|---|---|---|
| 2,149,253 | 3/1939 | Cooper | 427/11 |
| 2,464,437 | 3/1949 | Dasher | 192/107 M X |
| 3,553,007 | 1/1971 | Hennig | 427/11 |
| 4,105,473 | 8/1978 | Anderson et al. | 427/11 X |
| 4,110,512 | 8/1978 | Roy et al. | 427/11 X |

FOREIGN PATENT DOCUMENTS 2264275  7/1974  Fed. Rep. of Germany ... 188/251 M

Primary Examiner—Rodney H. Bonck
Attorney, Agent, or Firm—Martin A. Farber

[57] ABSTRACT

A clutch disk for a clutch used in an automobile having facings on both sides thereof. The facing is made of sintered steel with a porous structure. A rust preventive having a greater ionization potential than iron is impregnated in the facing. The rust preventive is selected from the group consisting of zinc phosphate and manganese phosphate.

10 Claims, 5 Drawing Figures

CLUTCH DISK FOR A CLUTCH AND METHOD OF TREATING A FACING OF A CLUTCH

BACKGROUND OF THE INVENTION

The present invention relates to a clutch for vehicles, and more particularly to a clutch disk for a clutch used in an automobile, in which clutch disk a rust preventive is impregnated. There is a clutch disc having facings which are made of sintered steel. In such a clutch, moisture in the air tends to deposit on the sliding surfaces of the facings of the clutch disk, flywheel and pressure plate of the clutch moistening the surfaces, since these members are located closely to each other with an appropriate gap. Further the moisture inside the clutch of a vehicle hardly evaporates. Accordingly, rust easily forms on the inner parts. The rust formed on the sliding surfaces of the facings and the flywheel causes both members to stick to each other and causes problems with the clutch such as failure of disengagement of the clutch if the vehicle is not driven for a long time. Therefore, rust preventives must be provided on the sliding surfaces during manufacturing the automobile to prevent rusting which will occur before it is given to a user.

In a conventional rust prevention method, sodium nitrite is impregnated into the facings of the clutch disk and the surfaces made of iron of the flywheel and pressure plate are kept in a passive state, so that the formation of rust on the surfaces is prevented. In such a clutch disk, a sufficient amount of sodium nitrite must be maintained in the facings to obtain a satisfactory anti-corrosion effect.

However, the rust preventive of sodium nitrite is apt to be removed from the facing by the sliding of the facing on the flywheel during the use of the clutch for the transportation of the automobile before transfer of it to a user. As a result, sufficient rust preventing effect is not expected.

SUMMARY OF THE INVENTION

The object of the present invention is to provide a clutch disk having a sufficient rust preventive effect, even after the clutch is once used and stored for a time.

The present invention will be more apparent from the following description made with reference to the accompanying drawings.

DETAILED DESCRIPTION OF THE PRESENT INVENTION

Figure 1:
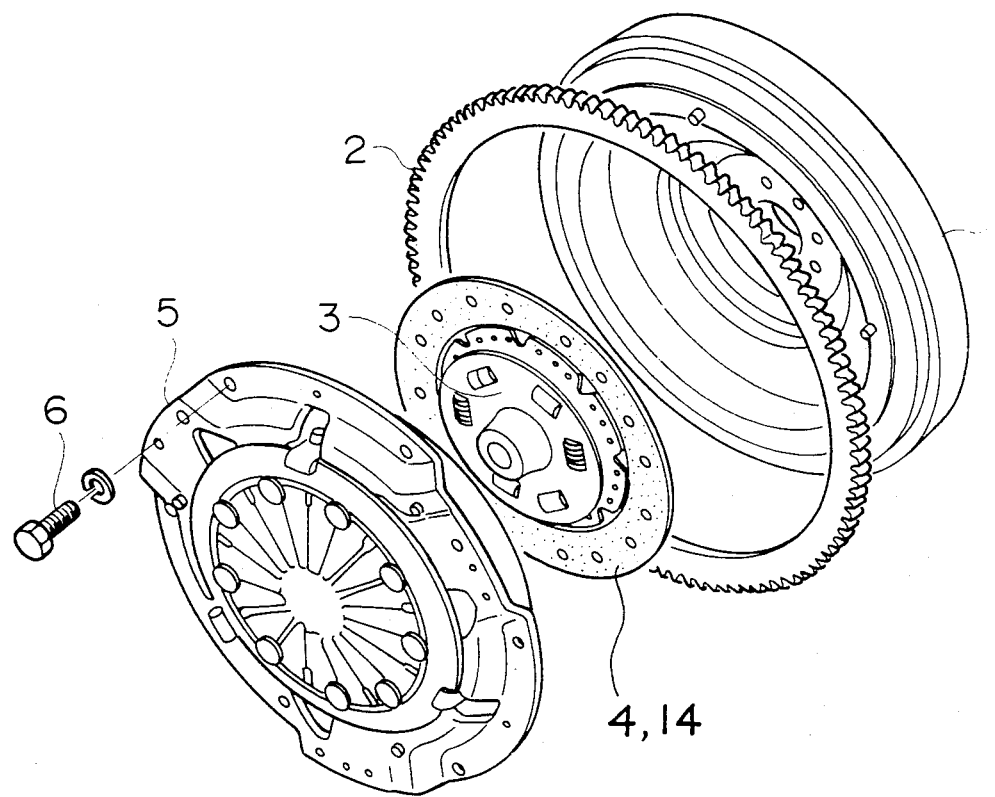
FIG. 1 is an exploded perspective view of a clutch.
Figure 2A:
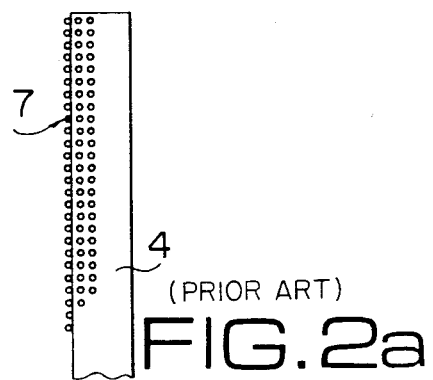
FIGS. 2a and 2b are explanatory broken-away cross-sectional views showing conventional facings.
Figure 2B:
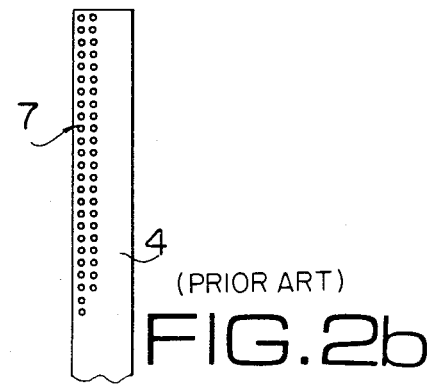

The conventional rust prevention treatment is explained with reference to the attached drawing. In FIG. 1 showing a clutch for an automobile, a flywheel 1 is connected with a crankshaft of an engine (not shown), and a ring gear 2 engaging with a starter (not shown) is fixed to the periphery of the flywheel 1. In the flywheel 1, there is a clutch disk 3 connected with a transmission input shaft and has facings 4 secured to both sides thereof. A pressure plate 5 is further attached to the flywheel 1 by screws 6. Each facing 4 is made of sintered steel in porous structure. FIGS. 2a and 2b show cross sections of one of the facings 4 which is impregnated with sodium nitrite 7. In FIG. 2a, which shows the state before the facing 4 has been used, sodium nitrite 7 appears on the surface of the facing 4. If such facings with sodium nitrite 7 on the surfaces are disposed between the flywheel 1 and pressure plate 5, the flywheel 1 and pressure plate 5 are prevented from rusting. However, after use of the clutch for moving the automobile, the surface of the facing 4 wears as shown in FIG. 2b and the sodium nitrite on the surface is removed. Therefore, unless sodium nitrite remaining inside the facing 4 comes out on the surface, rust prevention is not effected. Actually it takes a long time before the sodium nitrite 7 inside the facing 4 comes out on the surface. Therefore satisfactory rust prevention cannot be expected after sodium nitrite 7 has been removed from the surface and the formation of rust will occur on the surface of the clutch member when the automobile reaches a user.

The object of the present invention is to eliminate such a drawback of the conventional clutch disk.

Figure 3A:
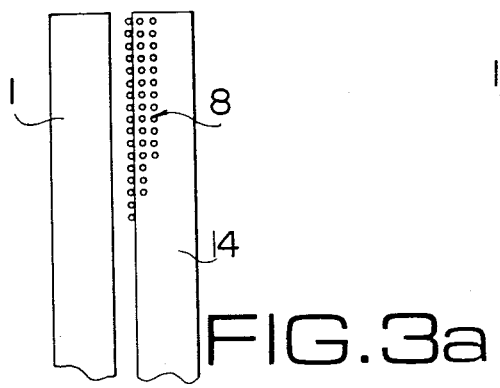
FIGS. 3a and 3b are explanatory broken-away cross-sectional views showing facings according to the present invention with a flywheel.

Referring to FIG. 3a showing the facing 14 corresponding to the flywheel 1 according to the present invention, a rust preventive 8 is impregnated in the facing 14. The rust preventive is a compound having a greater ionization potential than iron, such as zinc phosphate.

Figure 3B:
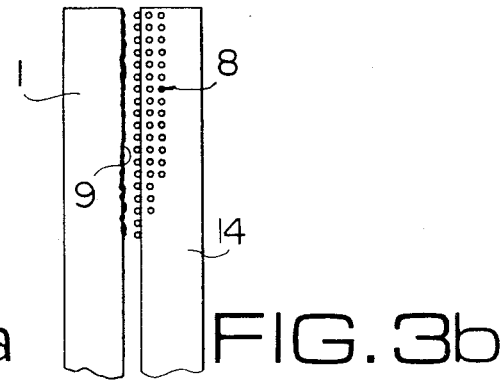

Before the clutch operates, the state of which is shown in FIG. 3a, zinc phosphate 8 impregnated in the facing 14 does not appear on the surface of the flywheel 1. However, when the clutch is operated, the facings of both sides of the clutch disk engage with the flywheel 1 and the pressure plate 5, sliding therebetween, generating friction heat on the surfaces of both of the facings 14. The friction heat and moisture on these members cause the zinc phosphate 8 in the facing 14 to react with the iron which is a component of the flywheel 1, forming a protection film 9 of zinc phosphate and iron phosphate on the sliding surface of the flywheel 1 as shown in FIG. 3b. Because of the greater ionization potential of zinc compared with iron, zinc in the zinc phosphate oxidizes before oxidation of the iron of the sliding surface of the flywheel. The zinc phosphate on the surface of the flywheel acts as an anode when the iron oxidizes, thereby preventing rust of the iron. Therefore, a long lasting rust preventive effect occurs.

In the described embodiment of the present invention, zinc phosphate 8 is used as the rust preventive, but the invention is not limited to the zinc phosphate. The rust preventive according to the invention is selected from compounds having a greater ionization potential than iron, such for example as manganese phosphate.

In accordance with the present invention, a rust prevention film is formed on sliding surfaces of the flywheel 1 and pressure plate 5 to prevent rusting thereof, even if the clutch is used for the transportation of the automobile.

What is claimed is:

1. A clutch for a vehicle, the clutch having a clutch disk and having an iron member operatively slidably engaging a facing of the clutch disk comprising porous metallic facings provided on both sides of the clutch disk, each of said facings is impregnated with a rust preventive consisting of at least one compound having a greater ionization potential than iron and being reactable with iron under the influence of heat and moisture, such that the compound reacts with the iron to form a rust prevention film on the iron member which acts as an anode as the iron oxidizes to prevent oxidation of the iron member.

2. The clutch according to claim 1, wherein said member is a flywheel.

3. The clutch according to claim 1, wherein said member is a pressure plate.

4. A clutch disk for a clutch having an iron member frictionally cooperating with a facing of the clutch disk used in a vehicle, comprising
  porous metallic facings on both sides of the clutch disk frictionally cooperating with said iron member, each of said facings is impregnated with a rust preventive consisting of at least one compound having a greater ionization potential than iron, such that the compound reacts with the iron to form a rust prevention film on the iron member which acts as an anode as the iron oxidizes to prevent oxidation of the iron member.

5. The clutch disk for a clutch used in a vehicle according to claim 1 wherein said compound is zinc phosphate.

6. The clutch disk for a clutch used in a vehicle according to claim 1 wherein said compound is manganese phosphate.

7. A method of treating a facing of a clutch comprising the steps of
  making the facing from a porous metallic material, and
  impregnating in the porous metallic material a rust preventive consisting of at least one compound having a greater ionization tendency than iron.

8. The method of treating a facing of a clutch according to claim 7 wherein said porous metallic material is sintered steel.

9. The method of treating a facing of a clutch according to claim 7 wherein said compound is zinc phosphate.

10. The method of treating a facing of a clutch according to claim 7 wherein said compound is manganese phosphate.

* * * * *